March 10, 1959     J. A. WETTENDORF     2,876,738
INTRUDER-FREE BIRD HOUSE
Filed Oct. 16, 1956

INVENTOR.
Joseph A. Wettendorf
BY
ATTORNEY

United States Patent Office 2,876,738
Patented Mar. 10, 1959

2,876,738

INTRUDER-FREE BIRD HOUSE

Joseph A. Wettendorf, Kansas City, Mo.

Application October 16, 1956, Serial No. 616,320

1 Claim. (Cl. 119—23)

The present invention relates to bird houses, and has for its purpose the provision of favorable nesting quarters for the protection of the martin species of birds, known as purple martins, and also including simple and effective means for trapping and exterminating other undesirable bird species generally regarded as nuisance types such as sparrows, starlings, etc.

One primary feature of my invention is to devise a bird house construction of this type in which the nesting quarters is provided not only with the usual entrance opening to the nesting chamber but also with closure means adapted for temporarily closing said opening at times for trapping purposes, and also with an additional opening for renovating purposes and having a door adapted to be opened but kept normally closed.

More specifically, the invention comprises an improved bird house construction formed with any desired number of nesting chambers, each having an extrance opening and also a separate cleanout opening, with separate closure means for said openings, together with means for maintaining the same in temporarily closed position. In the preferred form of the invention the closure means for the front entrance openings to the nesting chambers are designed to be operated simultaneously or in unison for both opening and closing said entrance openings, while the closure elements for the separate cleanout openings are arranged for independent opening and closing operation. In this connection also, identical markings are provided for the entrance and cleanout openings corresponding to the same nesting chambers to enable the attendant to locate the proper door for cleanout operation according to observations made at the entrance openings as hereinafter explained.

With the foregoing general objects in view, the invention will now be described in detail by reference to the accompanying drawing illustrating one form of construction which I have devised for embodying the proposed improvements, after which those features and combinations deemed to be novel and patentable will be particularly set forth and claimed.

As already indicated, the primary object of my invention is a bird house construction having a nesting chamber in which provision is made for both entrance and cleanout openings and having suitable closure means for both openings, and while this idea may be embodied in a bird house having a single nesting chamber, the improvement is very readily adapted for embodiment of a plurality of nesting chambers in a single bird house unit, and accordingly such a construction is illustrated in the accompanying drawing.

Referring now to the said drawing in detail; the improved device is illustrated therein as comprising a bird house structure formed of suitable wood material, to provide front and rear walls 4 and 5, between opposite side walls 6, below a roof or canopy structure 10.

Figure 1:
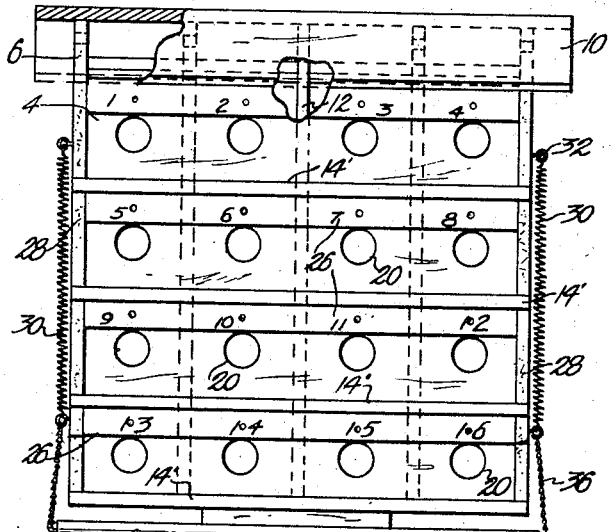
Figure 1 is a front elevation illustrating a bird house constructed in accordance with my invention (parts of the top portion being broken away), and showing the closure means for the front entrance openings to the individual nesting chambers in elevated position for allowing free passage through said openings.
Figure 3:
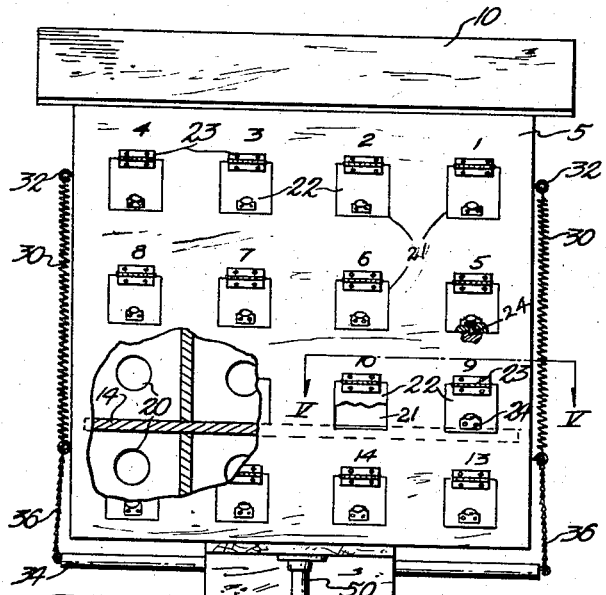
Figure 3 is a rear elevation of the same (a part of the rear wall being broken away to disclose the interior of the structure)

The interior space is divided by suitably spaced vertical walls 12 and horizontal floor members 14 to form multiple chambers 16 in superposed rows; as, for example, four rows or tiers of four chambers each and numbered from 1 to 16 at both the front and rear of the bird house, as illustrated in Figures 1 and 3. Each of the floors 14 is formed with a front landing projection 14', and each of the chambers 1 to 16 is provided with a front entrance opening 20 at the front, as well as a cleanout opening 21 at the rear of the bird house.

The rear cleanout openings 21 are all adapted to be kept normally closed by means of door elements 22 supported by hinges 23, and all of said door elements are provided with suitable spring balls or equivalent latching elements 24 for fastening the same in said normally closed position.

Figure 4:
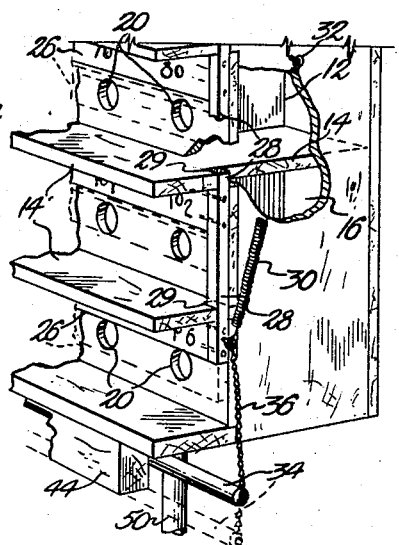
Figure 4 is a fragmentary perspective view of a part of the bird house on a larger scale, with one of the side walls being partly broken away to disclose a part of the interior.
Figure 5:
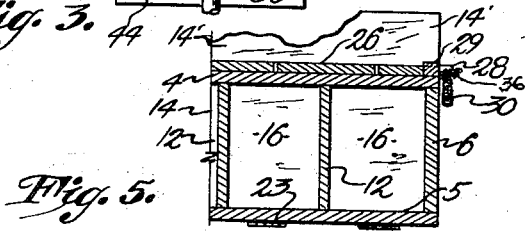
Figure 5 is a horizontal sectional view representing a section taken on the line 5—5 of Figure 3.

On the other hand, the front entrance openings 20 are designed to be left normally open, but are adapted to be closed at times by means of a set of horizontal closure bars 26 which bear markings "1" to "16" to correspond to the entrance openings 20 of the several chambers; these bars 26 are carried by a pair of vertical side pieces or strips 28 that slide vertically in suitable guideways 29 at the opposite ends of the floor members 14, as shown in Figure 4, these side pieces or strips being movably supported by a pair of coil springs 30 attached, as indicated at 32, to opposite sides of the bird house. The set of closure bars 26 are arranged for simultaneous operation, as by means of a pull bar 34 suspended by link connections 36 from the lower ends of the sliding side pieces 28. With this arrangement and construction it is obvious that the closure bars 26 may be operated in unison for simultaneously closing all the front entrance openings 20 by pulling down on the bar 34 and moving the same into retaining engagement with the botton edge or the lower portion of a block 44 attached underneath the front edge of the bottom landing projection 14' as represented by the dotted lines in Figure 4. On the other hand, on release of said pull bar 34 from its retaining engagement with block 44, the springs 30 will automatically return said closure bars to their original position as required for opening up the entrance passages 20 as represented by the full lines in Figure 4.

Figure 2:
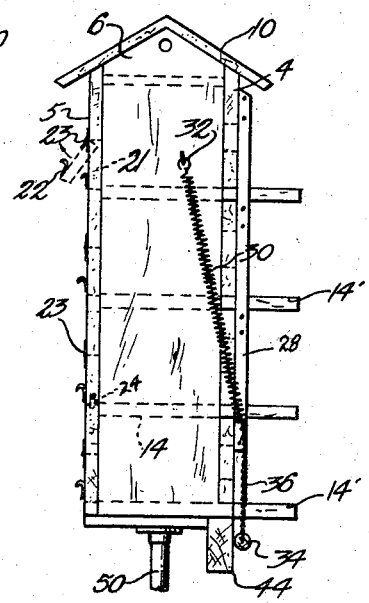
Figure 2 is a side elevation of the improved bird house.

To the under face of the bottom floor member 14 is also secured an upright post or spindle 50, as shown in Figures 1 to 3, designed to facilitate mounting of the bird house structure upon a suitable upright post or other support in any desired outdoor position, as required for its use.

In normal operation the front or entrance openings 20 to the nesting chambers are all left open—that is, with the chains 36 and the pull bar 34 in freely suspended relation to the ends of the lower door-closure bar 26, as represented in Figures 1 and 2 and the full lines of Figure 4 of the drawing; on the other hand, all the individual doors 22 of the nesting chambers are closed, and maintained latched in closed position by the series of latch elements 24, as shown in Figure 3 of the drawing. The bird house is thus left open for free use by birds indiscriminately, until such time as it is noted that some undesired species is making use of one or more of the nesting chambers and it is proposed to terminate such undesired occupancy. For this purpose the proprietor or caretaker, after making note of the numbers of the chambers occupied by such objectionable species, proceeds to pull down the bar 34 into latched relation to the lower edge of block 44, thereby lowering all the door-closure bars 26 into door-closing position all as represented by the dotted lines in Figure 4 of the drawing. This operation of course traps all occupants of any of the nesting chambers, while the caretaker proceeds to open up the rear doors 22 bearing the numbers noted as having objectionable occupants, and removes the contents thereof for proper disposal. After all such chambers have been properly scavenged, the doors thereto are again closed and relatched, and the bar 34 released for allowing the springs 30 to raise the door-closure bars 26 automatically to their normal or door-open position, as illustrated by the full lines in Figure 4.

The foregoing operation is preferably carried out at night time or after dark and with aid of a suitable nightlight to facilitate the placing of a step ladder in proximity to the rear of the bird house but without any engagement with either the bird house or its support.

A period of a half hour or more may be allowed between the scavenging operation and the reopening of the front doors of the house. While the undesired birds and their nests were being done away with the martins may of course be somewhat disturbed or even temporarily frightened, yet since they are in no way touched or harmed they readily resume their normal life and activity, flying out at daybreak as usual.

While I have illustrated and described what I have found to represent a satisfactory and efficient form of bird house construction for the embodiment of my invention, I desire to be understood as reserving the right to make such changes or modifications as may fairly fall within the scope of the appended claim.

Having thus described my invention, what I claim and desire to secure by Letters Patent is:

A bird house structure comprising multiple bird nesting chambers in superposed rows, each of said chambers having a front entrance opening and a rear cleanout opening, a set of transversely extending closure bars movable vertically for simultaneously opening and closing the entrance openings of each of said rows of nesting chambers, vertically sliding strips secured to the opposite ends of said closure bars and having yielding supporting means for maintaining said bars normally in entrance-open position, a pull bar flexibly connected with the lower ends of said vertically sliding strips and operative to actuate said closure bars simultaneously into entrance-closing relation to said entrance openings, and separate and independent door elements for closing each of the cleanout openings to said chambers.

References Cited in the file of this patent

UNITED STATES PATENTS

| | | |
|---|---|---|
| 828,751 | Knudson | Aug. 14, 1906 |
| 1,270,283 | Glander | June 25, 1918 |
| 1,674,193 | Coltrin | June 19, 1928 |
| 1,949,085 | Shallit | Feb. 27, 1934 |
| 2,733,427 | Chandler | Jan. 31, 1956 |